UNITED STATES PATENT OFFICE.

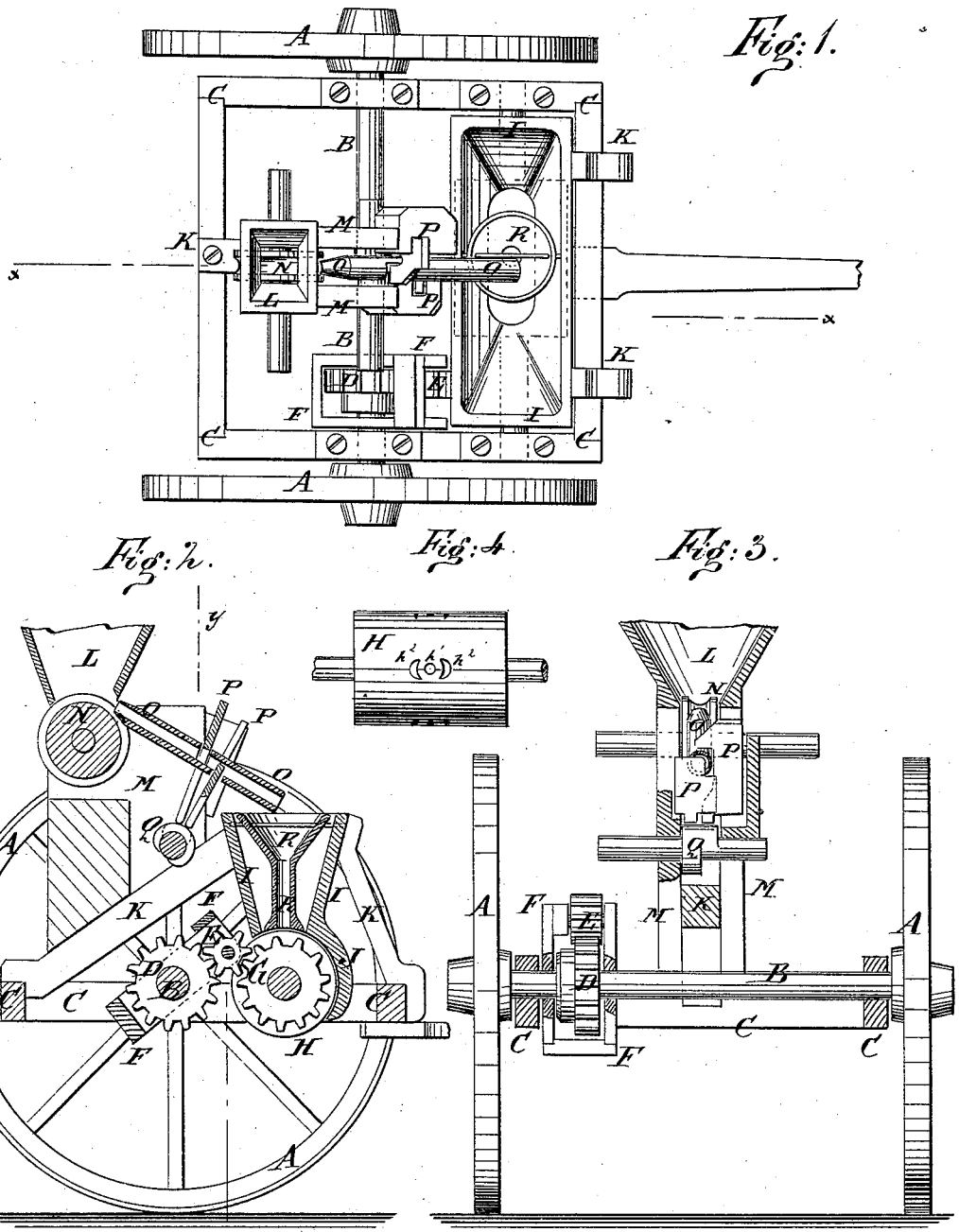

NELSON BIRDSALL, OF ASHLAND, VIRGINIA.

IMPROVEMENT IN COMBINED SEED-PLANTER AND FERTILIZER-DISTRIBUTER.

Specification forming part of Letters Patent No. 221,276, dated November 4, 1879; application filed March 24, 1879.

*To all whom it may concern:*

Be it known that I, NELSON BIRDSALL, of Ashland, in the county of Hanover and State of Virginia, have invented a new and useful Improvement in Combined Seed-Planter and Fertilizer-Distributer, of which the following is a specification.

Figure 1 is a top view of my improved machine. Fig. 2 is a longitudinal section of the same taken through the line $x\,x$, Fig. 1. Fig. 3 is a cross-section of the same taken through the line $y\,y$, Fig. 2. Fig. 4 is a side view of the dropping-cylinder.

Similar letters of reference indicate corresponding parts.

The object of this invention is to furnish an improved machine for sowing, drilling, or planting any desired seed, and any desired fine fertilizer, and which shall be simple in construction and reliable in operation.

The invention consists in the combination of the grooved wheel, the inclined tube, the two valves, the double cam, and the conductor-tube with the seed-hopper, the fertilizer-hopper, and the dropping-cylinder; and in the dropping-cylinder provided with two sets of pockets, to adapt it to receive, carry out, and drop a fertilizer from the hopper and seed from the conductor-tube, placed within or at the side of the said hopper, as hereinafter fully described.

A are the wheels, one or both of which are rigidly connected with the axle B, so as to carry the said axle with them in their revolution. The axle B revolves in bearings attached to the side bars of the frame C, and to it, near one end, is attached a large gear-wheel, D, the teeth of which mesh into the teeth of the small gear-wheel E.

The gear-wheel E is pivoted to a frame, F, which is pivoted to and rides upon the axle B, and should be provided with a lever, so that the driver can raise and lower it to throw the teeth of the gear-wheel E out of and into gear with the teeth of the gear-wheel G, attached to the journal or end of the dropping-cylinder H. The journals of the dropping-cylinder revolve in bearings attached to the frame C.

The upper part of the cylinder H fits into the concaved lower part of the hopper I, and forms the bottom of the said hopper. The hopper I is designed to receive the fertilizer to be distributed, and its forward side is extended down at the forward side of the cylinder H, to serve as a guard-apron, J, or has a guard-apron, J, attached to it, to prevent the fertilizer and seed from falling out of the pockets of the cylinder H before they reach the lower part of the said cylinder, so that they will fall to the ground in the desired place or places. The seed and fertilizer may be conducted to the ground through tubes, and for certain kinds of fertilizers an apron of wire-cloth may be attached to the frame, to receive and distribute the fertilizer broadcast. The hopper I is supported in position by the brace-bars K, the upper ends of which are attached to the said hopper, and their lower ends are attached to the frame C.

The seed to be planted or sown is placed in the hopper L, which is attached to supports M, attached at their lower ends to the frame C. The bottom of the hopper L is formed of a wheel, N, which is designed to be driven from the axle B by a band and pulleys, or other gearing, and which has a ring-groove formed in it to deliver the seed into a tube, O. The tube O is made of such a size that the seed to be planted or sown may pass through it freely and is supported from the frame C or supports M.

The tube O is placed in an inclined position so that the seed may slide through it freely, and is provided with two valves or cut-offs, P, placed at such a distance apart that the space between them within the said tube O may contain the exact quantity of seed to be dropped at a time.

The valves P are operated by a double cam, Q, which is pivoted to the supports M, and is designed to be operated from the axle B by a band and pulleys or other gearing.

The double cam Q is so formed as to open the upper valve P, and allow the seed to pass down and rest against the lower valve P. The upper valve P is then closed, to prevent any more seed from passing down the tube O, and the lower valve P is opened, to allow the seed between the valves P to pass out through the lower part of the tube O. The lower valve P is then closed, and the upper valve P is opened, to allow more seed to pass into the space between the valves, and so on.

As the seed escapes from the tube O it falls into the funnel-shaped upper end of the conductor-tube R, which is supported from the hopper I, and its lower end is concaved to fit upon the upper side of the cylinder H. The lower end of the conductor-tube R is made so wide that none of the fertilizer can come in contact with the cylinder H between the said end and the sides of the hopper I.

In the face of that part of the cylinder H that passes beneath the lower end of the tube R are formed pockets $h'$, to receive the seed and carry it out and drop it to the ground. And in the face of the cylinder H, at the sides of the pockets $h'$, and at the sides of the lower end of the tube R, are formed pockets $h^2$, to take the fertilizer from the hopper I and drop it to the ground.

Channels may be opened in the ground to receive the seed and the fertilizer, which may be covered by any of the ordinary appliances for such purposes.

The conductor-tube R may be placed within the hopper I, or at its side, as may be desired or convenient.

Having thus described my invention, I claim as new and desire to secure by Letters Patent—

1. The combination of the grooved wheel N, the inclined tube O, the two valves P, the double cam Q, and the conductor-tube R, with the seed-hopper L, the fertilizer-hopper I, and the dropping-cylinder H, substantially as herein shown and described.

2. The dropping-cylinder H, provided with two sets of pockets, $h^2$ $h'$, to adapt it to receive, carry out, and drop a fertilizer from the hopper I, and seed from the conductor-tube R, placed within or at the side of the said hopper I, substantially as herein shown and described.

NELSON BIRDSALL.

Witnesses:
J. W. TAYLOR,
C. H. TAYLOR.